April 9, 1963    J. M. ANDERSON    3,085,129
PLASTIC COATED METAL CABLE STRAP OR STAPLE
Filed Aug. 25, 1960

INVENTOR.
JOHN M. ANDERSON
BY
Wheeler, Wheeler & Wheeler
ATTORNEYS

United States Patent Office 3,085,129
Patented Apr. 9, 1963

3,085,129
PLASTIC COATED METAL CABLE
STRAP OR STAPLE
John M. Anderson, 416 W. Maple St., Sturgeon Bay, Wis.
Filed Aug. 25, 1960, Ser. No. 51,814
4 Claims. (Cl. 174—159)

This invention relates to a plastic coated metal cable strap or staple.

Metal cable straps or staples of the type shown in my U.S. Patent 2,418,539 are commonly used to anchor non-metallic electrical cables and the like to supporting surfaces. It has also been proposed to use for this purpose cable staples made entirely out of plastic or other insulating material. However, such all-plastic staples are not as strong as metal staples and are further subject to becoming brittle, particularly during cold weather. For these reasons all-plastic staples have not been widely accepted in the trade, even though they are made of non-conductive material which gives them a safety advantage when used on non-metallic cable.

According to the present invention, the insulating quality of a non-conductive plastic staple is retained in a staple which has a metal frame or bridge providing the necessary strength so that the staple can be used under all conditions. All exposed surfaces of the staple are non-conductive for the maximum of safety when used with a non-metallic cable.

Additional advantages of the invention include the following features:

(1) The formation in the staple of the present invention of plastic tubes which extend beyond the legs of the staple and which are subject to collapse on endwise pressure. Accordingly, the staple can be made to fit neatly and snugly about cables of different thickness.

(2) While one side of each nail is partially embraced by a metal channel strap formed out of the frame leg, its other side is restrained only by the plastic coating which completes the sleeving of the nail to provide a nailway. The side of the nail exposed to the plastic will thus engage a surface having a relatively high coefficient of friction, thus to frictionally hold the nail in any position to which it is adjustably set within the nailway and thus facilitate handling of the staple in the course of anchoring it to a supporting surface.

Other advantages, features and objects of the invention will appear from the following disclosure in which.

Figure 6:
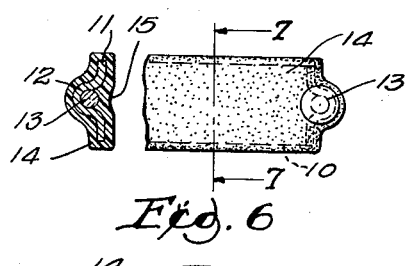
FIG. 6 is a fragmentary cross section taken along the line 6—6 of FIG. 3.
Figure 7:
FIG. 7 is a cross section taken along the line 7—7 of FIG. 6.

Cable staples embodying the present invention include a metallic frame or bridge member 10 having depending legs 11 from which are formed outwardly vertically elongated inwardly and laterally open channel straps or eyes 12. Further fabrication of the staple desirably involves the insertion through the strap eyes 12 of nails 13 and the subsequent step of coating the frame 10 and a portion of the nail shanks which extend beyond the legs 11 with a suitable plastic or like electrically insulating coating material 14. The plastic coating 14 is desirably about equal in thickness to the metal frame 10 and fills in the otherwise laterally open sides of the channel straps 12 beyond the included nail shanks to constitute webs 15 or the like (FIG. 6) to complete the ensleeving of the nail shanks and to cooperate with the channel straps 12 to constitute nailways in which the nails are guided for nailing. The plastic circumferentially coats the shanks of the nails 13 for a short distance beyond the ends of the frame legs 11 to constitute plastic stand-off tubes 16 which completely surround the shanks of the nails 13 and further constitute collapsible leg extensions.

Inasmuch as the plastic material has a relatively high coefficient of friction, the nails 13 will tend to remain in any axial position to which they are pushed by hand, thus to facilitate manipulating the staple in the course of nailing it to a supporting surface 17.

Figure 1:
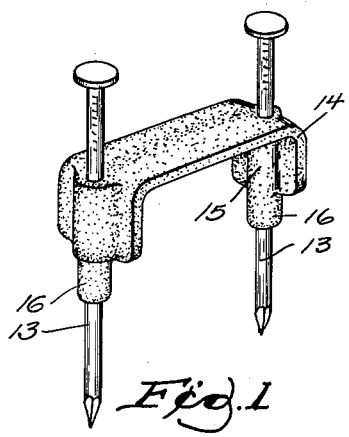
FIG. 1 is a perspective view of a cable strap or staple embodying the present invention.
Figure 2:
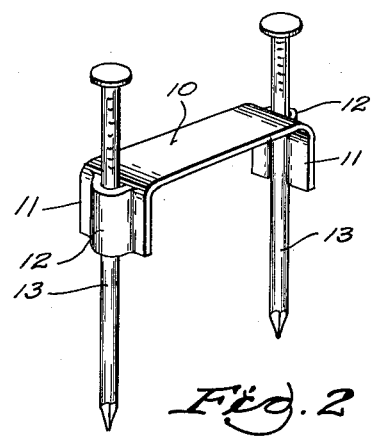
FIG. 2 is a perspective view of the cable strap or staple of FIG. 1 in its condition just prior to coating the metal frame and a portion of the nail shanks with plastic.
Figure 3:
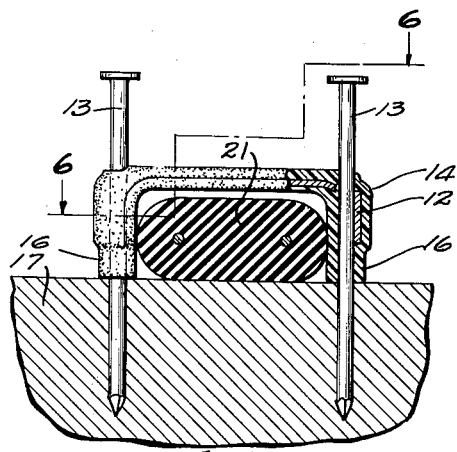
FIG. 3 is a fragmentary view in cross section taken through a cable staple in the course of using it to anchor a non-metallic sheathed cable to a supporting surface.
Figure 4:
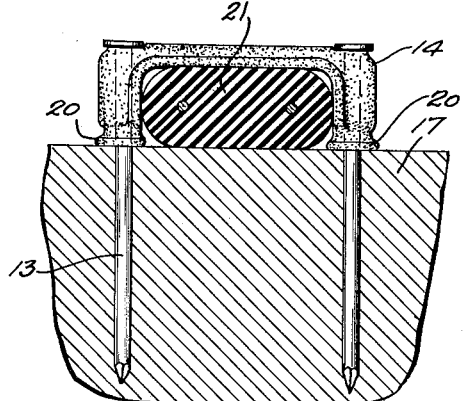
FIG. 4 is a cross section similar to that shown in FIG. 3, but showing the staple completely anchored.

The plastic tubes or leg extensions 16 are subject to collapse on endwise pressure, as illustrated in FIG. 4 where the partially collapsed tubes are identified by reference character 20. FIGS. 3 and 4 illustrate anchoring a relatively thin non-metallic two-wire cable 21 to a supporting surface 17. The distance between the ends of the plastic tube 16 and the undersurface of the coated bridge 10 of the staple is greater than the thickness of the cable 21. Accordingly, the last few blows of the hammer against each nail 13 will cause axial collapse of the tubes 20 and permit a neat and snug envelopement of the conduit 21 by the staple, as shown in FIG. 4.

Figure 5:
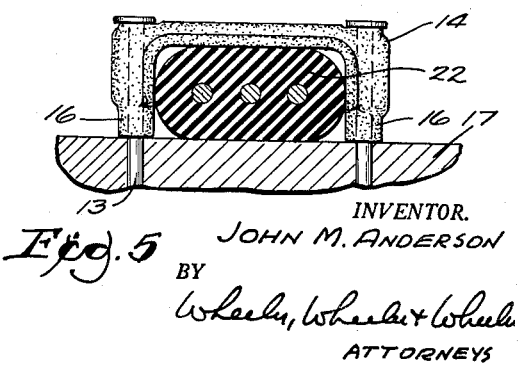
FIG. 5 is a cross section of a staple embodying the invention in its position anchoring a cable which is thicker than the one shown in FIG. 4.

In the case of thicker conduits, for example the three-wire conduit 22 shown in FIG. 5, collapse of the tubes 16 may not occur. The tubes will nevertheless in most instances abut the supporting surface 17 to stabilize the staple in position. Accordingly, a leg potrion of the staple will abut the surface 17 regardless of the thickness of the cable, subject only to the collapse of the plastic tubes 16 for thin conduits.

Even if the staple is tilted in the course of nailing, it has no exposed sharp metallic edge which would tend to dig or cut into the non-metallic sheathing of the cable with the possibility of causing a short circuit. The relatively blunt and soft plastic coating on the bridge will distribute the pressure of the staple against the cable and tend to prevent rupture of the fibers of the cable. Even if the fibers are ruptured, the plastic coating is a non-conductor of electricity to prevent any short-circuiting of the wires in the cable. Yet the metal frame or bridge 10 will give the staple the strength that it needs to withstand the pressures to which it is subject in the course of nailing it to the supporting surface and will also withstand thermal and other pressures which might otherwise tend to crack the staple if it were made exclusively of a plastic material.

I claim:

1. A cable staple comprising a metal bridge having legs, channel straps formed out of said legs to provide laterally open nailways, nails in said nailways and a coating of plastic on said bridge and legs and which envelops the otherwise open sides of said nailways to complete tubes about said nails, said tubes consisting partially of said channel straps and partially of said coating said coating completely ensleeving said nails circumferentially beyond said legs to constitute tube extensions which readily collapse on endwise pressure, the legs of the bridge limiting said collapse to said tube extensions.

2. A cable staple comprising a metal bridge having legs, a coating of plastic on said bridge and legs, nailways formed in said legs and coating, plastic tubes extending beyond the ends of said legs and comprising extensions of said nailways subject to ready collapse on endwise pressure, the legs of the bridge limiting said collapse to the plastic tubes therebeyond.

3. The combination with a non-metallic cable, of a cable staple comprising a staple-shaped metal frame, a coating of electrical insulating material on said frame, said frame having legs with nailways and nails therein, said coating extending beyond the ends of said legs and providing tubes through which said nails project, said tubes being subject to collapse on endwise pressure to facilitate fitting the cable staple to the cable, the legs of the bridge limiting said collapse to the tubes therebeyond.

4. The combination of claim 3 in which said legs have channel straps which are laterally open to partially surround the shanks of said nails, said coating filling in the otherwise laterally open sides of said channel straps to complete laterally closed nailways for said nails.

References Cited in the file of this patent

UNITED STATES PATENTS

| | | |
|---|---|---|
| 1,705,144 | Tobey | Mar. 12, 1929 |
| 2,418,539 | Anderson | Apr. 8, 1947 |
| 2,526,902 | Rublee | Oct. 24, 1950 |
| 2,724,303 | Holcomb | Nov. 22, 1955 |
| 2,901,200 | Vocks | Aug. 25, 1959 |

FOREIGN PATENTS

| | | |
|---|---|---|
| 1,077,284 | Germany | Mar. 10, 1960 |
| 1,196,604 | France | May 25, 1959 |